United States Patent
Kano

(10) Patent No.: US 10,674,039 B2
(45) Date of Patent: Jun. 2, 2020

(54) IMAGE PROCESSING SYSTEM, INFORMATION PROCESSING DEVICE, IMAGE PROCESSING DEVICE AND NON-TRANSITORY RECORDING MEDIUM

(71) Applicant: KONICA MINOLTA, INC., Chiyoda-ku, Tokyo (JP)

(72) Inventor: Takahiro Kano, Toyonaka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/427,708

(22) Filed: Feb. 8, 2017

(65) Prior Publication Data
US 2017/0244866 A1     Aug. 24, 2017

(30) Foreign Application Priority Data
Feb. 24, 2016   (JP) .................................. 2016-032679

(51) Int. Cl.
*G06F 21/31*     (2013.01)
*G06F 21/60*     (2013.01)
(Continued)

(52) U.S. Cl.
CPC ......... *H04N 1/4426* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 7,346,930 B1 * 3/2008 Boydstun ................ H04L 63/02
726/29
7,694,137 B2 * 4/2010 Matsuya ............... H04L 63/104
380/231
(Continued)

FOREIGN PATENT DOCUMENTS

JP     2013-003733 A     1/2013
JP     2014-059790        4/2014
(Continued)

OTHER PUBLICATIONS

The extended European Search Report dated Oct. 4, 2017, by the European Patent Office in corresponding European Application No. 17156005.5. (11 pages).
(Continued)

*Primary Examiner* — Beniyam Menberu
(74) *Attorney, Agent, or Firm* — Buchanan Ingersoll & Rooney PC

(57) ABSTRACT

An information processing device that performs an authentication to authenticate a user and controls operations of an image processing device based on a result of the authentication, comprising: an application that accesses the image processing device and performs a process to enable the image processing device to operate; and an authentication server that performs the authentication to authenticate the user and sends application information relating to the application to the image processing device when successfully authenticating the user through the authentication. The application generates an access request including information relating to the application and sends the generated access request to the image processing device when accessing the image processing device in response to an instruction given by the authenticated user who is successfully authenticated through the authentication.

23 Claims, 10 Drawing Sheets

(51) Int. Cl.
  *G06F 3/12*   (2006.01)
  *H04N 1/00*   (2006.01)
  *H04N 1/327*  (2006.01)
  *H04N 1/44*   (2006.01)
  *G06K 15/02*  (2006.01)
  *G06F 21/41*  (2013.01)
  *H04L 29/06*  (2006.01)

(52) U.S. Cl.
  CPC .......... *G06F 3/1239* (2013.01); *G06F 3/1285* (2013.01); *G06F 21/31* (2013.01); *G06F 21/41* (2013.01); *G06F 21/608* (2013.01); *H04L 63/08* (2013.01); *H04L 63/102* (2013.01); *H04N 1/00464* (2013.01); *H04N 1/32771* (2013.01); *H04N 1/4413* (2013.01); *G06F 3/1204* (2013.01); *G06F 3/129* (2013.01); *G06F 3/1212* (2013.01); *G06F 3/1236* (2013.01); *H04N 2201/0094* (2013.01); *H04N 2201/3205* (2013.01)

(56) References Cited

U.S. PATENT DOCUMENTS

| | | | | |
|---|---|---|---|---|
| 9,594,895 | B2 * | 3/2017 | Fukuda | G06F 21/41 |
| 2002/0062453 | A1 * | 5/2002 | Koga | G06F 21/608 |
| | | | | 726/32 |
| 2004/0054904 | A1 * | 3/2004 | Matsuya | G06F 21/608 |
| | | | | 713/168 |
| 2004/0117655 | A1 * | 6/2004 | Someshwar | H04L 63/0227 |
| | | | | 726/1 |
| 2005/0046890 | A1 * | 3/2005 | Shudo | G06F 21/606 |
| | | | | 358/1.14 |
| 2005/0060564 | A1 * | 3/2005 | Murakami | G06F 21/51 |
| | | | | 726/26 |
| 2005/0225798 | A1 * | 10/2005 | Ishige | G06F 3/1204 |
| | | | | 358/1.15 |
| 2006/0280515 | A1 * | 12/2006 | Harada | G03G 21/04 |
| | | | | 399/80 |
| 2007/0124516 | A1 * | 5/2007 | Ohara | G06F 21/608 |
| | | | | 710/62 |
| 2007/0174429 | A1 | 7/2007 | Mazzaferri et al. | |
| 2007/0255428 | A1 * | 11/2007 | Nagata | G03G 15/5075 |
| | | | | 700/8 |
| 2007/0268518 | A1 * | 11/2007 | Yokoyama | G06F 21/608 |
| | | | | 358/1.15 |
| 2008/0034419 | A1 * | 2/2008 | Mullick | H04L 63/0272 |
| | | | | 726/15 |
| 2008/0046720 | A1 * | 2/2008 | Sugishita | G06F 21/629 |
| | | | | 713/156 |
| 2009/0077654 | A1 * | 3/2009 | Hong | G06F 21/34 |
| | | | | 726/20 |
| 2009/0180141 | A1 * | 7/2009 | Takaishi | G03G 15/5075 |
| | | | | 358/1.15 |
| 2009/0251724 | A1 * | 10/2009 | Nakajima | G06F 21/608 |
| | | | | 358/1.15 |
| 2010/0259773 | A1 * | 10/2010 | Okabe | G03G 15/5087 |
| | | | | 358/1.9 |
| 2011/0004920 | A1 * | 1/2011 | Ejima | H04W 12/06 |
| | | | | 726/3 |
| 2011/0173686 | A1 * | 7/2011 | Ueno | H04N 1/00204 |
| | | | | 726/6 |
| 2011/0228311 | A1 * | 9/2011 | Oguma | G06F 21/305 |
| | | | | 358/1.14 |
| 2011/0299110 | A1 * | 12/2011 | Jazayeri | G06F 3/1204 |
| | | | | 358/1.15 |
| 2013/0133085 | A1 * | 5/2013 | Tsujimoto | G06F 21/6245 |
| | | | | 726/28 |
| 2013/0139240 | A1 * | 5/2013 | Sawayanagi | G06F 21/41 |
| | | | | 726/8 |
| 2013/0258406 | A1 * | 10/2013 | Sarin | G06K 15/002 |
| | | | | 358/1.15 |
| 2013/0340048 | A1 * | 12/2013 | Sebastian | H04L 63/08 |
| | | | | 726/4 |
| 2014/0033287 | A1 * | 1/2014 | Kawai | H04L 63/083 |
| | | | | 726/7 |
| 2014/0078538 | A1 * | 3/2014 | Morikawa | H04N 1/00233 |
| | | | | 358/1.13 |
| 2014/0282490 | A1 | 9/2014 | Shinomiya et al. | |
| 2014/0285826 | A1 * | 9/2014 | Sato | G06F 3/1292 |
| | | | | 358/1.6 |
| 2014/0351910 | A1 | 11/2014 | Tenenboym et al. | |
| 2014/0368867 | A1 * | 12/2014 | Kim | G06F 3/1204 |
| | | | | 358/1.15 |
| 2015/0029532 | A1 * | 1/2015 | Lee | G06F 3/1238 |
| | | | | 358/1.14 |
| 2015/0281501 | A1 * | 10/2015 | Araki | H04N 1/00938 |
| | | | | 358/1.13 |
| 2018/0123676 | A1 | 5/2018 | Kawabata | H04B 7/14 |

FOREIGN PATENT DOCUMENTS

| | | | | |
|---|---|---|---|---|
| JP | 2014-179034 | 9/2014 | | |
| WO | WO-2015088036 A1 * | 6/2015 | | B41J 29/00 |

OTHER PUBLICATIONS

Office Action issued in corresponding Japanese Patent Application No. 2016-032679, dated Apr. 17, 2018. (8 pages).

Office Action issued in corresponding Chinese Patent Application No. 201710091316.X, dated Sep. 5, 2018 (16 pages).

* cited by examiner

IMAGE PROCESSING SYSTEM 1

FIG. 3A

USER INFORMATION 25

| USER NAME | USER ID | PASSWORD |
|---|---|---|
| TANAKA | 1025468 | ******** |
| YAMADA | 2351472 | ******** |
| SUZUKI | 2189963 | ******** |

FIG. 3B

AUTHORITY INFORMATION 26

| USER NAME | USER ID | AUTHORITY |
|---|---|---|
| TANAKA | 1025468 | COPY AND CLOUD ACCESS NOT ALLOWED |
| YAMADA | 2351472 | COLOR OUTPUT NOT ALLOWED |
| SUZUKI | 2189963 | MFP COOPERATION NOT ALLOWED |

FIG. 3C

APPLICATION INFORMATION 27

| APPLICATION NAME | APPLICATION NUMBER | FUNCTION |
|---|---|---|
| COPY | 123456789 | SCAN/PRIT |
| SCAN | 234567891 | SCAN/BOX/EMAIL |
| PRINT | 345678912 | PRINT/BOX |
| CLOUD ACCESS | 456789123 | SCAN/PRINT/BOX |
| MFP COOPERATION | 567891234 | SCAN/PRINT/BOX |

IMAGE PROCESSING SYSTEM 1

IMAGE PROCESSING SYSTEM, INFORMATION PROCESSING DEVICE, IMAGE PROCESSING DEVICE AND NON-TRANSITORY RECORDING MEDIUM

The present U.S. patent application claims a priority under the Paris Convention of Japanese patent application No. 2016-032679 filed on Feb. 24, 2016, the entirety of which is incorporated herein by references.

BACKGROUND OF THE INVENTION

Field of the Invention

The present invention relates to an image processing system, an information processing device, an image processing device and a non-transitory recording medium. The present invention more specifically relates to a technique to use a function in the image processing device from outside of the image processing device.

Description of the Background Art

A technique to prevent an improper leakage of data such as an address book to outside by an application installed on a mobile phone is known. This known technique is introduced for example in Japanese Patent Application Laid-Open No. JP 2013-3733 A. According to the known technique, application information relating to a registered application is registered in advance with the mobile phone. As execution of the application is started at the mobile phone, an application acknowledgement code is output from the application to a secure processing part. The secure processing part then determines whether or not the application information corresponding to the application acknowledgement code is registered in advance. The application information corresponding to the application acknowledgement code may be registered in advance. In this case, the secure processing part issues a request ID to allow the access, and notifies the application which is registered in advance of the issued request ID. The application which is registered in advance with the mobile phone is notified the request ID. That means the application being notified the request ID is not always the application that issues the application acknowledgement code. Therefore, even when the unauthorized application issues the improper application acknowledgement code, the unauthorized application is not allowed to access the data such as the address book.

Recent image processing devices such as MFPs (Multi-Function Peripherals) are capable of executing jobs in response to instructions from applications installed on devices such as external personal computers (PC) and/or portable terminals. The registered application that operates the image processing device by a remote control is provided by not only an authorized vendor of the image processing device but also a third vendor, realizing an improvement in user-friendliness of the image processing device.

The image processing device may allow every access from the external application. In this case, it compromises the security. In order to avoid this, it is considered to apply the known technique regarding the mobile phone as described above to the image processing device, for example. To be more specific, the information relating to the registered application provided by the authorized vendor and/or the third vendor is registered in advance with the image processing device. When the image processing device detects the access from the external application, it determines if the external application is the application registered in advance. The image processing device may allow the access only if the external application is the registered application, then the security compromise may be controlled.

On the other hand, it is difficult to register all the information relating to the registered application with the image processing device because it associates with complicated works. Also, the number of the registered applications including ones provided by the third vendor is increasing in the future. It becomes much more difficult to register in advance all the information relating to the registered application with the image processing device, and the works to register with the image processing device occur every time the new application is released.

SUMMARY OF THE INVENTION

The present invention is intended to solve the above problems. Thus, the present invention is intended to provide an image processing system, an information processing device, an image processing device and a non-transitory recording medium capable of enabling the image processing device only to allow an access from a reliable application even if information relating to the application is not registered in advance with the image processing device, thereby controlling not to have the low level of security of the image processing device.

First, the present invention is directed to information processing device that performs an authentication to authenticate a user and controls operations of an image processing device based on a result of the authentication.

To achieve at least one of the abovementioned objects, according to an aspect, the information processing device reflecting one aspect of the present invention comprises: an application that accesses the image processing device and performs a process to enable the image processing device to operate; and an authentication server that performs the authentication to authenticate the user and sends application information relating to the application to the image processing device when successfully authenticating the user through the authentication. The application generates an access request including information relating to the application and sends the generated access request to the image processing device when accessing the image processing device in response to an instruction given by the authenticated user who is successfully authenticated through the authentication.

Second, the present invention is directed to an image processing system.

To achieve at least one of the abovementioned objects, according to an aspect, the image processing system reflecting one aspect of the present invention comprises: an above described information processing device and an image processing device. The image processing device includes: a storage in which application information received from an authentication server is stored; and a determining unit that cross-checks information in an access request with the application information stored in the storage when the access request is received from an application, thereby determining whether or not to allow an access from the application.

Third, the present invention is directed to an image processing system.

To achieve at least one of the abovementioned objects, according to an aspect, the image processing system reflecting one aspect of the present invention comprises: an information processing device, an authentication server and an image processing device. The authentication server includes an authenticating part that performs an authentication to authenticate a user in response to an authentication request received from the information processing device, and sends a result of the authentication to the information processing device. The information processing device includes: an application that accesses the image processing device and performs a process to enable the image processing device to operate; and a transmitting part that sends application information relating to the application to the image processing device when successfully authenticating the user through the authentication. The image processing device includes: a storage in which the application information received from the transmission part is stored; and a determining unit that cross-checks information included in an access request with the application information stored in the storage, thereby determining whether or not to allow the access from the application when the access request is received from the application in the information processing device.

Fourth, the present invention is directed to an image processing device capable of executing a job relating to an image processing.

To achieve at least one of the abovementioned objects, according to an aspect, the image processing device reflecting one aspect of the present invention comprises: a storage that stores therein application information received from an authentication server in response to receiving the application information when a user is successfully authenticated at the authentication server capable of authenticating the user; a determining unit that cross-checks information included in an access request with the application information stored in the storage, thereby determining whether or not to allow the access from the application when the access request is received from an external application; and a job controller that executes a job in response to an instruction from the application when the access from the application is allowed by the determining unit.

Fifth, the present invention is directed to a non-transitory recording medium storing a computer readable program to be executed by an authentication server that performs an authentication to authenticate a user and manages an application that uses an image processing device.

To achieve at least one of the abovementioned objects, according to an aspect, the non-transitory recording medium reflecting one aspect of the present invention stores the computer readable program to be executed by the authentication server that performs the authentication to authenticate the user and manages the application that uses the image processing device. Execution of the computer readable program by the authentication serve causing the authentication serve to execute the steps of: (1) performing the authentication to authenticate the user; and (2) sending application information relating to the application to the image processing device when the user is successfully authenticated through the authentication.

Sixth, the present invention is directed to a non-transitory recording medium storing a computer readable program to be executed by an image processing device capable of executing a job relating to an image processing.

To achieve at least one of the abovementioned objects, according to an aspect, the non-transitory recording medium reflecting one aspect of the present invention stores the computer readable program to be executed by the image processing device capable of executing the job relating to the image processing. Execution of the computer readable program by the image processing device causing the image processing device to execute the steps of: (1) storing application information received from an authentication server in a predetermined storage in response to receiving the application information when a user is successfully authenticated at an authentication server capable of authenticating the user; (2) cross-checking information included in an access request with the application information stored in the storage, thereby determining whether or not to allow the access from the application when the access request is received from an external application; and (3) executing a job in response to an instruction from the application when the access from the application is allowed in the step (2).

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 3A, 3B and 3C show an example of user information, authority information and application information;

DESCRIPTION OF THE PRESENT PREFERRED EMBODIMENTS

Hereinafter, embodiments of the present invention will be described with reference to the drawings. However, the scope of the invention is not limited to the illustrated examples.

First Preferred Embodiment

Figure 1:
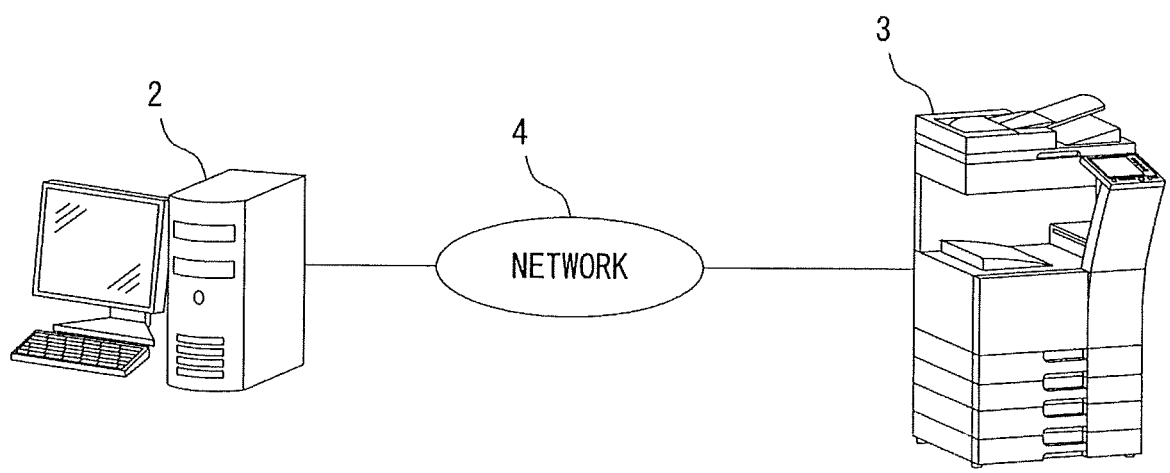
FIG. 1 shows an exemplary configuration of an image processing system of a first preferred embodiment.

FIG. 1 shows an exemplary configuration of an image processing system 1 of the first preferred embodiment of the present invention. The image processing system 1 comprises an information processing device 2 and an image processing device 3 that are capable of sending and receiving data to and from each other over a network 4. The information processing device 2 is constructed by a device such as a computer and the image processing device 3 is constructed by a device such as one of MFPs. The information processing device 2 has a function to authenticate a user who uses the image processing device 3 and a function to operate the image processing device 3 by a remote control from outside by executing an application installed in advance. The image processing device 3 includes multiple functions relating to an image processing such as a copy function, a scan function and a print function, for example. Also, the image processing device 3 includes a box function to store data including document data, for instance, in a predetermined storage area (BOX) and an email transmission function to send emails to external addresses besides the above-mentioned functions. The number of the image processing devices 3 connected to the network 4 is not always one, and it can be more.

Figure 2:
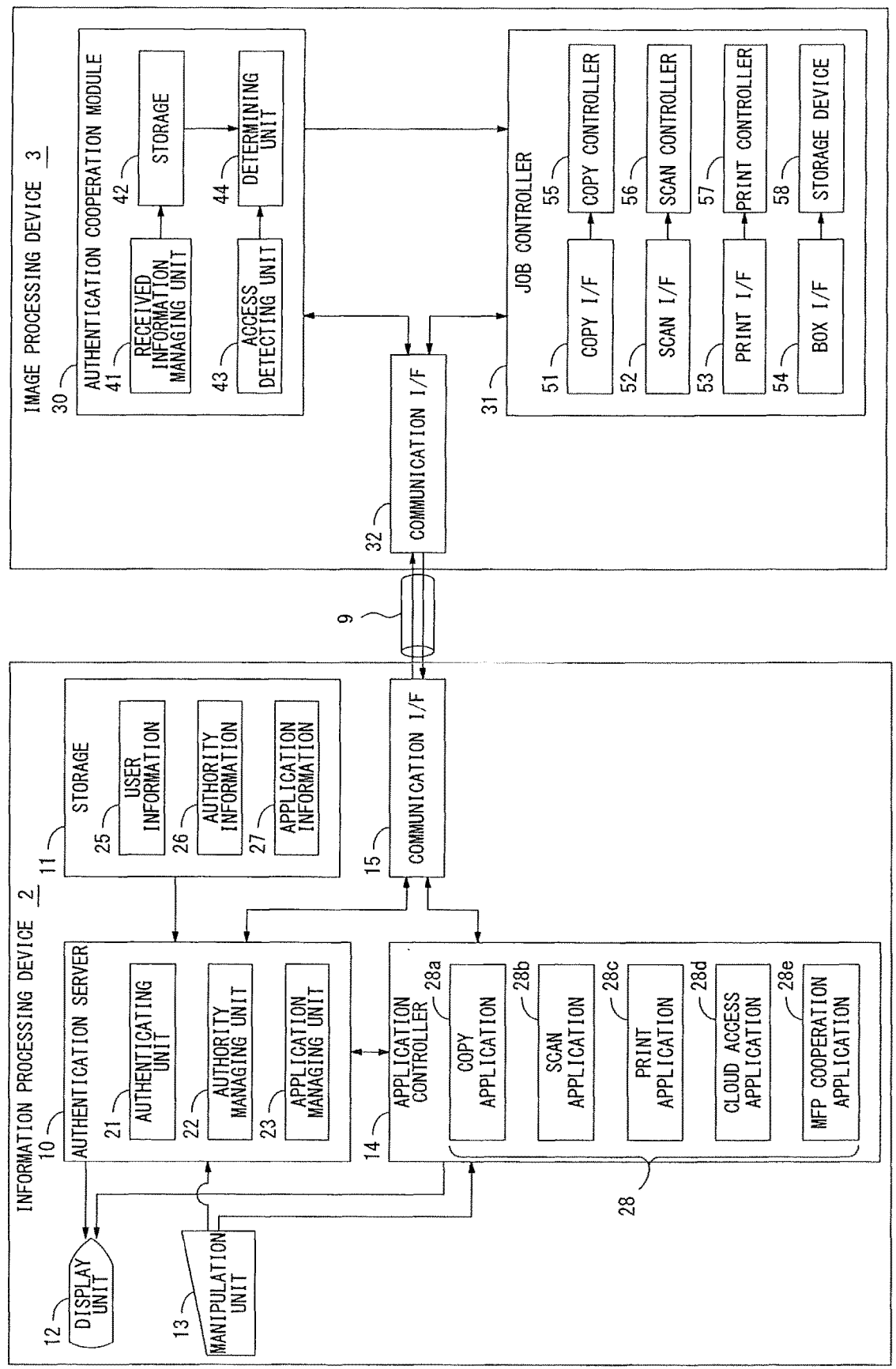
FIG. 2 is a block diagram showing an example of a hardware structure and that of a functional structure of each of an information processing device and an image processing device.

FIG. 2 is a block diagram showing an example of a hardware structure and that of a functional structure of each of the information processing device 2 and the image processing device 3. The information processing device 2 includes an authentication server 10, a storage 11, a display unit 12, a manipulation unit 13, an application controller 14 and a communication interface 15. The image processing device 3 includes an authentication cooperation module 30, a job controller 31 and a communication interface 32.

First, each component of the information processing device 2 is explained in detail. The authentication server 10 of the information processing device 2 authenticates the user who uses the image processing device 3. It is assumed, for example, that the hardware structure includes a CPU and a memory. In such a case, the CPU executes a predetermined program so that the authentication server 10 is realized. The CPU executes the predetermined program so that the authentication server 10 serves as an authenticating unit 21, an authority managing unit 22 and an application managing unit 23. The authenticating unit 21 performs an authentication to authenticate the user. The authority managing unit 22 manages an authority of each user on the use of the image processing device 3. The application managing unit 23 manages an application 28 that brings the image processing device 3 into operation.

The storage 11 is an auxiliary storage formed from a device such as a semiconductor memory or a magnetic disk device, for example. Information relating to the user who uses the image processing device 3 is stored as user information 25 in the storage 11. The authority of the user on the use of the image processing device 3 is stored as authority information 26 in the storage 11. Also, information about the application 28 that has been installed on the information processing device 2 and operates the image processing device 3 by the remote control is registered advance with application information 27 and stored in the storage 11.

The display unit 12 and the manipulation unit 13 are a user interface for the user who uses the information processing device 2. The display unit 12 on which various types of information is displayed to the user who uses the information processing device 2 is formed from a device such as a color liquid crystal display, for instance. The manipulation unit 13 receives entry by the user who uses the information processing device 2. The manipulation unit 13 is formed with parts such as a keyboard, a mouse and/or touch panel keys arranged on the screen of the display area of the display unit 12, for example.

The application controller 14 executes the application 28 that brings the image processing device 3 into operation on the information processing device 2. As illustrated in FIG. 2, there are multiple applications 28a to 28e installed on the information processing device 2 as the application 28 that brings the image processing device 3 into operation. The application controller 14 selects and runs at least one of the multiple applications 28a to 28e.

The copy application 28a, for example, uses the copy function in the image processing device 3. The copy application 28a is capable of enabling the image processing device 3 to execute a copy job. The scan application 28b, for example, uses the scan function in the image processing device 3. The scan application 28b is capable of enabling the image processing device 3 to execute a scan job. The print application 28c, for example, uses the print function in the image processing device 3. The print application 28c is capable of enabling the image processing device 3 to execute a print job. The cloud access application 28d accesses a could server on a cloud to enable the cloud server and the image processing device 3 to work together. The cloud access application 28d, for example, enables the cloud server to forward job data to the image processing device 3 or the image processing device 3 to forward the job data to the cloud server. The MFP cooperation application 28e enables the multiple image processing devices 3 to work together. The MFP cooperation application 28e, for example, enables one of the the image processing devices 3 to forward the job data to another image processing device 3. The application controller 14 runs each application 28a to 28e so that the information processing device 2 is allowed to operate the image processing device 3 by the remote control to execute the job. When each application 28a to 28e is not necessary to be distinguished, the application is just referred as the application 28.

The communication interface 15 is to communicate with a variety of devices over the network 4. The information processing device 2 communicates with the image processing device 3 via the communication interface 15.

FIGS. 3A, 3B and 3C show an example of the user information 25, the authority information 26 and the application information 27. The user information 25 is referred to for the authentication by the authenticating unit 21. As illustrated in FIG. 3A, for example, a user ID and a password are registered for each user who uses the image processing device 3. The user information 25 is created or updated by an administrator of the information processing device 2, for instance, and stored in the storage 11.

The authority information 26 is managed by the authority managing unit 22. As illustrated in FIG. 3B, for example, the user ID and an authority are registered for each user registered with the user information 25. As for the authority, for example, the function which is not available for the user of the functions included in the image processing device 3 is registered. The authority information 26 is created or updated by the administrator of the information processing device 2, for instance, and stored in the storage 11. The authority managing unit 22 manages the authority information 26 in the storage 11.

The application information 27 is managed by the application managing unit 23. As illustrated in FIG. 3C, for example, an application name, an application number and the function used by the application 28 of the functions included in the image processing device 3 are registered for each application 28 installed on the information processing device 2. The application number is for identification of the individual application. The application 28 registered with the application information 27 is proved to be a reliable application by the authentication server 10. To be more specific, the application 28 registered with the application information 27 builds a secure relationship (trust circle) with the authentication server 10 so that it is proved not being the unauthorized application.

The application information 27 is added by the application managing unit 23 everytime the new application 28 is installed on the information processing device 2. It is assumed, for example, the new application 28 which is downloaded from a reliable server which is specified in advance is installed on the information processing device 2. In this case, the application managing unit 23 obtains the information relating to the application 28 from the server from which the application is downloaded, and automatically registers the obtained information with the application information 27. The application information 27, however, is not always automatically registered. The application information 27 may be registered by the administrator of the information processing device 2 by manual at the installation of the application 28.

Referring back to FIG. 2, when the user who uses the image processing device 3 enters the user ID and the password through the manipulation unit 13, the authenticating unit 21 of the authentication server 10 authenticates the user. More specifically, the authenticating unit 21 reads the user information 25 in the storage 11, and determines if the same combination of the user ID and the password as that entered by the user is registered with the user information 25. If the same combination is registered with the user information 25, the authentication results in success. If the same combination of the user ID and the password as that entered by the user is not registered with the user information 25, the authenticating unit 21 determines that the authentication results in failure.

In response to authenticating the user through the authentication, the authenticating unit 21 notifies the authority managing unit 22 of the information relating to the authenticated user. The authority managing unit 22 then extracts the authority information relating to the authenticated user of the authority information of the multiple users registered with the authority information 26, and outputs the extracted information to the authenticating unit 21. As a result, the authenticating unit 21 is allowed to obtain the authority information relating to the authenticated user on the use of the image processing device 3 in response to authenticating the user thorugh the authentication.

After obtaining the authority information relating to the authenticated user, the authenticating unit 21 notifies the application managing unit 23 of the function available for the authenticated user or the function unavailable for the authenticated user based on the obtained authority information. The authenticating unit 21 then requests for the application information relating to the application 28 available for the authenticated user. When the function available for the authenticated user or the function unavailable for the authenticated user is notified by the authenticating unit 21, the application managing unit 23 extracts the application information relating to the application 28 available for the authenticated user from the information registered with the application information 27 based on the notification, and outputs the extracted information to the authenticating unit 21. As a result, the authenticating unit 21 is allowed to obtain the application information relating to the application 28 available for the authenticated user in response to authenticating the user through the authentication.

When the user is authenticated through the authentication, the authenticating unit 21 generates unique identification information relating to the information processing device 2. This identification information may be, for instance, an IP address of the information processing device 2 or a server certificate that certifies an issuance at the authentication server 10.

Also, when the user is authenticated through the authentication, the authenticating unit 21 enables the information processing device 2 to enter a logged-in state from a logged-out state. The authenticated user who had identified through the authentication is allowed to use the image processing device 3 in the logged-in state. After enabling the information processing device 2 to enter the logged-in state, the authenticating unit 21 establishes a session 9 to communicate with the image processing device 3 with a predetermined protocol. The authenticating unit 21 sends login information to the image processing device 3 through the session 9. The login information includes a variety of information as described later besides the application information relating to the application 28 available for the authenticated user.

After sending the login information to the image processing device 3, the authenticating unit 21 brings the application controller 14 into operation. The application controller 14 then becomes operative at the information processing device 2 and the application 28 is allowed to be executed. When bringing the application controller 14 into operation, the authenticating unit 21 notifies the application controller 14 of the application information relating to the application 28 available for the authenticated user.

The application controller 14 becomes operative when the information processing device 2 enters the logged-in state. The application controller 14 then identifies the application 28 available for the authenticated user of the multiple applications 28a to 28e based on the application information notified by the authenticating unit 21. The application controller 14 creates an application selecting screen which allows the identified application 28 to be selected, and displays the created screen on the display unit 12. As a result, the authenticated user is allowed to select the application 28 which is available for him/her and gives an instruction to execute the application 28 after logging into the information processing device 2. After the application 28 is selected by the authenticated user, the application controller 14 executes the program corresponding to the selected application 28, thereby executing the application 28.

The application 28 executed by the application controller 14 sends an access request to the image processing device 3 to start the communication with the image processing device 3. The access request thereby sent includes various types of information as described later besides the application information set for use with the application 28. The application 28 receives a permission notice that allows the aceess from the image processing device 3, thereby starting a process to operate the image processing device 3 by the remote control. To be more specific, the application 28 displays a job setting screen to set the job to be executed at the image processing device 3 on the display unit 12, and configures the settings on the job executed at the image processing device 3 based on a user's job setting operation. Also, the application 28 enables the image processing device 3 to execute the job specified by the authenticated user in response to a job execution instruction by the authenticated user.

For communicating with the image processing device 3, the application 28 establishes the communication via the application managing unit 23, for example, thereby establishing the communication via the session 9 established with the image processing device 3 by the authentication server 10. In this case, the application managing unit 23 encapsulates the information sent and received between the application 28 and the image processing device 3 with the predetermined protocol, thereby sending and receiving information via the session 9. If, however, the access request to the image processing device 3 is received from the application 28 which is not under the control of itself, the application managing unit 23 does not send the access request by encapsulating it. Therefore, transmission of the access request from the unauthorized application to the image processing device 3 may be prevented.

The authenticating unit 21 enables the information processing device 2 to be back to the logged-out state from the logged-in state in response to the logout operation by the authenticated user. After the authenticated user gives the instruction to logout, the authenticating unit 21 sends the logout information to the image processing device 3.

Each component of the image processing device 3 is explained next. The authentication cooperation module 30 of the image processing device 3 operates in cooperation with the authentication server 10 of the information processing device 2. It is assumed, for example, that the hardware structure includes a CPU, a memory and an auxiliary storage. In such a case, the CPU executes a predetermined program so that the authentication cooperation module 30 is realized. The CPU executes the predetermined program so that the authentication cooperation module 30 serves as a received information managing unit 41, an access detecting unit 43 and a determining unit 44. The received information managing unit 41 manages the information received from the authentication server 10. The access detecting unit 43 detects the access from the application 28 executed on the information processing device 2. The determining unit 44 determines whether or not to allow the access from the application 28. The authentication cooperation module 30 includes a storage 42. The storage 42 is [[an]] a storage formed from an auxiliary storage device such as a semiconductor memory or a magnetic disk device, for example.

The job controller 31 includes a copy interface 51, a scan interface 52, a print interface 53, a box interface 54, a copy controller 55, a scan controller 56, a print controller 57 and a storage device 58. The copy interface 51, the scan interface 52, the print interface 53 and the box interface 54 are used when the respective external applications 28 activate each function in the image processing device 3 by the remote control. The authentication cooperation module 30 allows the access from the application 28 so that input and output of the variety of data between the application 28 and the respective parts, the copy controller 55, the scan controller 56, the print controller 57 and the storage device 58 are allowed.

The copy controller 55 controls an execution of the copy job at the image processing device 3. The scan controller 56 controls the execution of the scan job at the image processing device 3, and the print controller 57 controls the execution of the print job at the image processing device 3. The storage device 58 is a storage formed from a device such as a magnetic disk device, for example. Data including document data is stored in the storage device 58.

The communication interface 32 connects the image processing device 3 to the network 4 and enables the image processing device 3 to communicate with various types of devices over the network 4. The image processing device 3 communicates with the information processing device 2 via the communication interface 32.

The received information managing unit 41 of the authentication cooperation module 30 of the aforementioned structure establishes the session 9 in response to the request from the authentication server 10 to enable the image processing device 3 to receive the information from the authentication server 10. The session 9 is to communicate with the image processing device 3 with the predetermined protocol. After receiving the login information from the authentication server 10, the received information managing unit 41 stores the login information in the storage 42 and manages. The received information managing unit 41 manages the login information in the storage 42 until receiving the logout information from the authentication server 10.

After the login information is received and stored in the storage 42 by the received information managing unit 41, the access detecting unit 43 detects the access from the application 28 executed on the information processing device 2. To be more specific, the access detecting unit 43 detects the access request from the application 28 via the session 9 established with the authentication server 10, and outputs the access request to the determining unit 44. The access detecting unit 43 receives the access request via the session 9 established with the authentication server 10, thereby determining that the application 28 which is the sender of the access request has a certain level of reliability. When receiving the access request via the session 9 established with the authentication server 10, the access detecting unit 43 outputs the access request to the determining unit 44. When receiving the access request without the session 9, the access detecting unit 43 does not output the access request to the determining unit 44. As a result, the access requests may be screened primarily before the determination is made by the determining unit 44, resulting in improvement in security.

After receiving the access request from the access detecting unit 43, the determining unit 44 reads the login information in the storage 42, and cross-checks the information in the access request with the information in the login information. The determining unit 44 then determines whether or not to allow the access from the application 28. More specifically, the determining unit 44 determines the application 28 is reliable if the information in the login information received from the authentication server 10 and the information in the access request received from the application 28 match with each other, and allows the access from the application 28. The determining unit 44, on the other hand, is not allowed to validate that the application 28 is reliable when the information in the login information and the information in the access request do not match with each other, so it refuses the access from the application 28. The determining unit 44 notifies the application 28, the sender of the access request, of the result of the determination in response to the access request.

After sending a permission notice to allow the access to the application 28, the determining unit 44 releases the interface corresponding to the function available for the authenticated user of the copy interface 51, the scan interface 52, the print interface 53 and the box interface 54 to the application 28, and gives the instruction to allow the access from the application 28 to the job controller 31. As a result, when detecting the access to the interface corresponding to the function available for the authenticated user of the copy interface 51, the scan interface 52, the print interface 53 and the box interface 54 from the application 28 to which the determining unit 44 has sent the permission notice, the job controller 31 allows the access to make the function in the image processing device 3 available.

Figure 4:
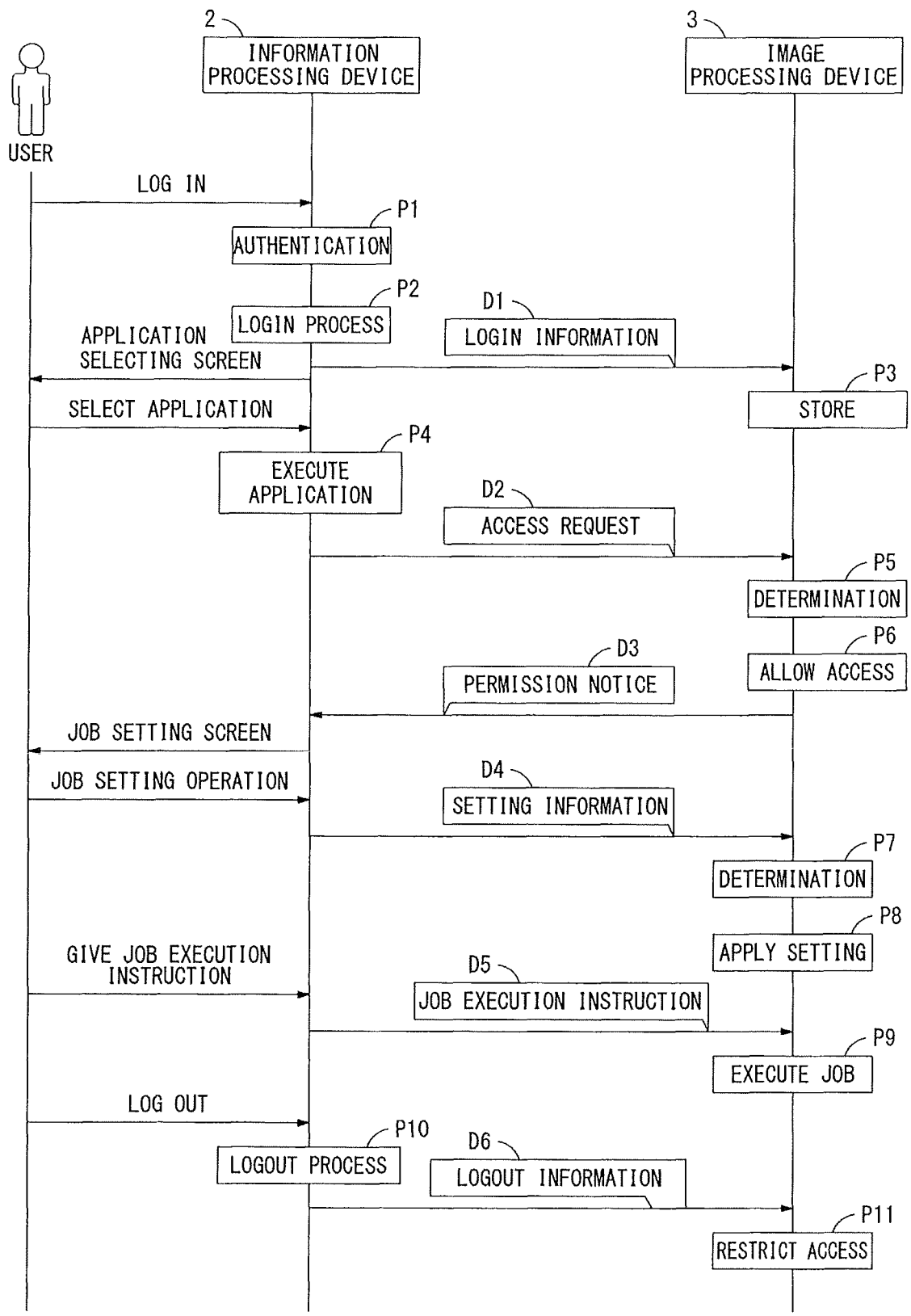
FIG. 4 is a flow diagram explaining an exemplary procedure of operations of the information processing device and the image processing device.

FIG. 4 is a flow diagram explaining an exemplary procedure of operations of the information processing device 2 and the image processing device 3 in the aforedescribed image processing system 1. The user may operate to login by entering the user ID and the password to the information processing device 2. In this case, the authentication server 10 of the information processing device 2 becomes operative to perform the authentication to authenticate the user (process P1). After the authentication results in success to authenticate the user, the authentication server 10 performs a login process to enter the logged-in state in which the authenticated user has logged in (process P2). If the authentication results in failure and the user is failed to be authenticated, the authentication server 10 does not perform the login process.

Figure 5A:
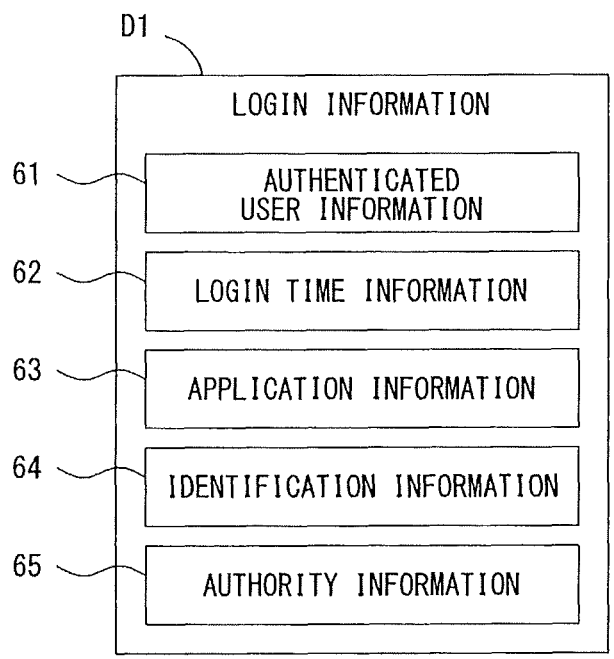
FIGS. 5A and 5B show an example of login information and an access request.

When performing the login process, the authentication server 10 of the information processing device 2 establishes the session 9 with the image processing device 3 and sends login information D1 to the image processing device 3. FIG. 5A shows an example of the login information D1 thereby sent. The login information D1 includes authenticated user information 61, login time information 62, application information 63, identification information 64 and authenticated user's authority information 65. The authenticated user information 61 is about the user authenticated by the authentication server 10, and the login time information 62 shows a time when the authenticated user has logged in. The application information 63 is about the application 28 available for the authenticated user. The identification information 64 is unique information generated by the authentication server 10. In response to receiving the login information D1 from the information processing device 2, the image processing device 3 stores and saves the received login information D1 in the storage 42 (process P3).

As the information processing device 2 enters the logged-in state, the application controller 14 of the information processing device 2 identifies the application 28 available for the authenticated user of the multiple applications 28a to 28e. The application controller 14 then displays an application selecting screen that enables the authenticated user to select and execute the identified application 28 on the display unit 12. When the authenticated user selects the application 28, the application controller 14 executes the application 28 selected by the authenticated user (process P4).

Figure 5B:
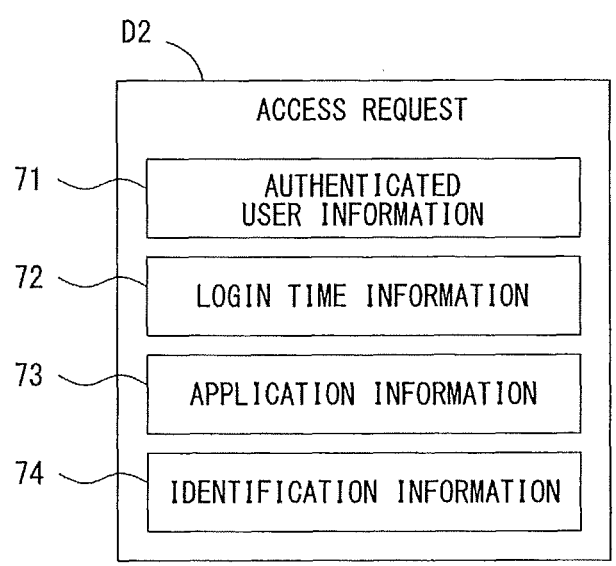

After the execution of the application 28 is started on the information processing device 2, the application 28 sends an access request D2 to the image processing device 3. FIG. 5B shows an example of the access request D2 thereby sent. The access request D2 includes authenticated user information 71, login time information 72 and identification information 74 that are received from the authentication server 10. The access request D2 also includes application information 73 set in advance with itself. The access request D2 is sent via the session 9 established between the information processing device 2 and the image processing device 3 as described above.

After receiving the access request D2 from the application 28 of the information processing device 2, the image processing device 3 brings the determining unit 44 into operation to determine whether or not to allow the access from the application 28 (process P5). In this determination, the determining unit 44 determines if each of the authenticated user information 71, the login time information 72, the application information 73 and the identification information 74 in the access request D2 of FIG. 5B matches with the corresponding authenticated user information 61, login time information 62, application information 63, and identification information 64 in the login information D2 of FIG. 5B. If all the information in the access request D2 matches with that in the login information D1, the determining unit 44 allows the access from the application 28 (process P6). If at least one of the information in the access request D2 does not match with the information in the login information D1, the determining unit 44 does not allow the access.

After allowing the access from the application 28, the determining unit 44 sends a permission notice D3 to the application 28 of the information processing device 2. In response to receiving the permission notice D3, the application 28 displays a job setting screen on the display unit 12 to accept the job setting operation by the authenticated user. The application 28 then generate job setting information D4 based on the job setting operation by the authenticated user, and sends the generated job setting information D4 to the image processing device 3.

When receiving the setting information D4 from the application 28, the image processing device 3 brings again the determining unit 44 into operation. The determining unit 44 determines if the setting of the job configured by the authenticated user is within the authority set for the authenticated user based on the authority information 65 in the login information D1 (process P7). If the setting configured by the authenticated user is within the authority, the determining unit 44 allows the job controller 31 to apply the setting based on the setting information D4. The job controller 31 then applies the setting of the job based on the setting information D4 received from the application 28 (process P8). The determining unit 44 allows the access from the application 28 based on the authenticated user's authority information 65 received in advance from the authentication server 10, resulting in more enhanced security. The determination to determine if the setting information D4 is within the authority set for the authenticated user may be carried out by each interface 51, 52, 53 and 54 of the job controller 31.

After the job execution instruction is given by the authenticated user, the application 28 sends a job execution instruction D5 to the image processing device 3. As receiving the job execution instruction D5 from the application 28, the job controller 31 of the image processing device 3 executes the job specified by the authenticated user (process P9).

When the authenticated user operates to log out from the information processing device 2, the authentication server 10 of the information processing device 2 performs a logout process (process P10). The information processing device 2 is then back to the logged-out state from the logged-in state. For performing the logout process, the authentication server 10 sends logout information D6 to the image processing device 3. The authentication cooperation module 30 of the image processing device 3 restricts the access from the application 28 when the logout information D6 is received from the authentication server 10 (process P11).

When the user is authenticated by the authentication server 10 of the aforementioned image processing system 1 that authenticates the user through the authentication, the application information 63 about the application 28 available for the authenticated user is sent in advance to the image processing device 3. The image processing device 3 stores the application information 63. When receiving the access request D2 from the application 28, the image processing device 3 cross-checks the information in the access request D2 with the application information 63 received in advance, thereby determining whether or not to allow the access from the application 28. As described above, the information related to the application 28 is not required to be registered in advance with the image processing device 3 so that the complicated operation is not necessary, resulting in improvement in the usefulness. When detecting the access from the application 28, the image processing device 3 authenticates if the access is from the registered application 28 based on the information previously received from the reliable authentication server 10. The image processing device 3 is then allowed to only allow the access from the reliable application 28. As a result, this may control not to have the low level of security of the image processing device 3.

The authentication server 10 sends the login information D1 to the image processing device 3 when the authenticated user logs in, and sends logout information D6 to the image processing device 3 when the authenticated user logs out. The image processing device 3 allows the access from the application 28 from the receipt of the login information D1 to the receipt of the logout information D6. As described above, the image processing device 3 never allows the access from the application 28 if the authenticated user has not logged in, realizing the much higher-security system.

The application 28 executed on the information processing device 2 communicates with the image processing device 3 via the session 9 established by the authentication server 10 with the image processing device 3. The image processing device 3 may receive the information from the application 28 without the session 9. In this case, the image processing device 3 is allowed to determine instantly the information is from the unreliable application 28, and to discard the received information promptly.

The image processing device 3 makes the determination not only with the application information 73 in the access request D2 but also with the information that only the authentication server 10 has (such as the authenticated user information 61, the login time information 62 and the identification information 64, for instance) to determine if the application 28 is the registered application, realizing the much higher-security system.

Figure 6:
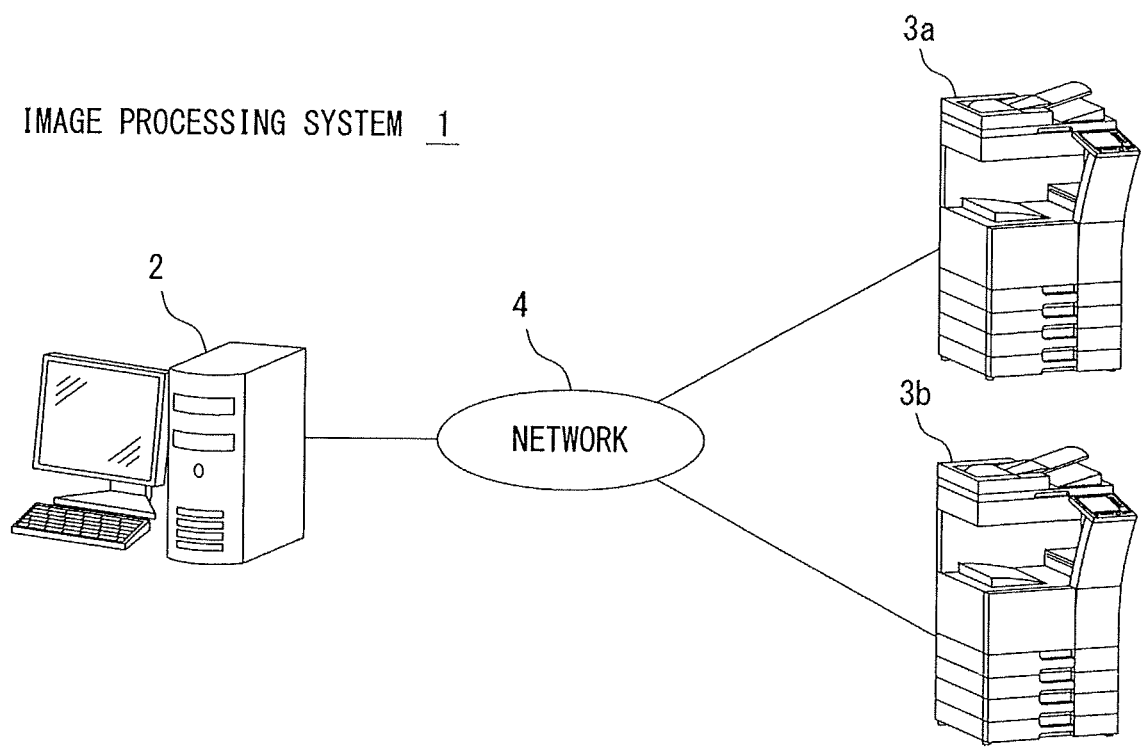
FIG. 6 shows an exemplary configuration of the image processing system when multiple image processing devices are installed.

FIG. 6 shows an exemplary configuration of the image processing system 1 when multiple image processing devices 3a and 3b are connected to the network 4. As shown in FIG. 6, if the MFP cooperation application 28e is executed at the information processing device 2, the MFP cooperation application 28e is allowed to enable the multiple image processing devices 3a and 3b to work together to execute the job.

Figure 7:
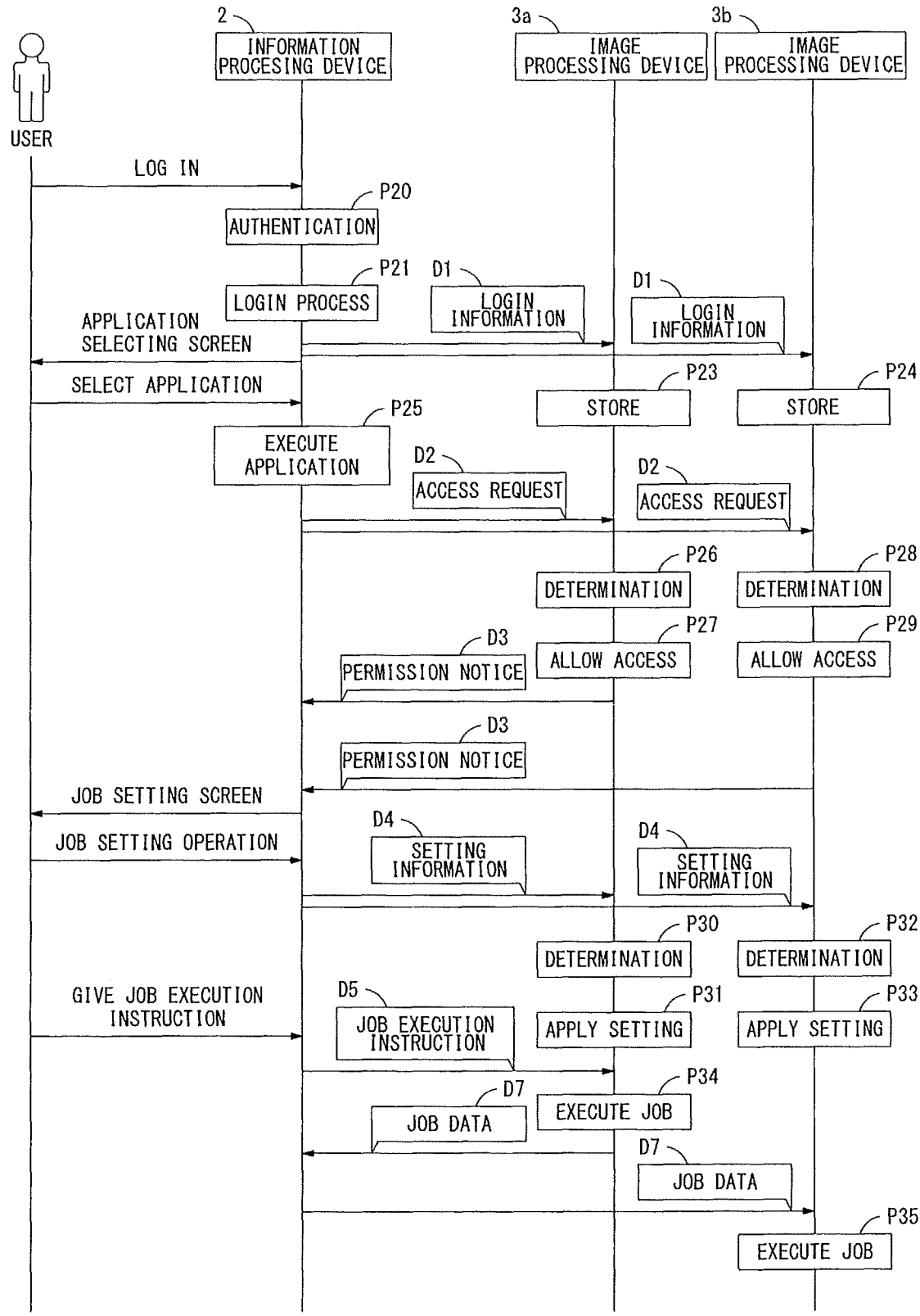
FIG. 7 is a flow diagram explaining an exemplary procedure of operations of the information processing device and the multiple image processing devices when the multiple image processing devices work together.

FIG. 7 is a flow diagram explaining an exemplary procedure of operations of the information processing device 2 and the multiple image processing devices 3a and 3b when the multiple image processing devices 3a and 3b work together. The user may operate to login to the information processing device 2. In this case, the authentication server 10 of the information processing device 2 becomes operative to perform authentication to authenticate the user (process P20). After the authentication results in success to authenticate the user, the authentication server 10 performs the login process to enter the logged-in state in which the authenticated user has logged in (process P21).

The authentication server 10 of the information processing device 2 establishes the session 9 with each of the multiple image processing devices 3a and 3b and sends the login information D1 to each of the multiple image processing devices 3a and 3b when the authenticated user logs in. After receiving the login information D1 from the information processing device 2, the image processing device 3a stores and saves the received login information D1 in the storage 42 (process P23). After receiving the login information D1 from the information processing device 2, the image processing device 3b also stores and saves the received login information D1 in the storage 42 (process P24). The MFP cooperation application 28e then may be executed at the information processing device 2 (process P25). In this case, the MFP cooperation application 28e sends the access request D2 to each of the multiple image processing devices 3a and 3b.

After receiving the access request D2 from the application 28 of the information processing device 2, the image processing device 3a brings the determining unit 44 into operation to determine whether or not to allow the access from the application 28 (process P26). When all the information in the access request D2 matches with the login information D1, the determining unit 44 allows the access from the application 28 (process P27). The determining unit 44 then sends the permission notice D3 to the MFP cooperation application 28e. The image processing device 3b performs the similar process (processes P28 and P29), and sends the permission notice D3 to the MFP cooperation application 28e.

After receiving the permission notice D3 from each of the multiple image processing devices 3a and 3b, the MFP cooperation application 28e displays the job setting screen on the display unit 12 to accept the job setting operation by the authenticated user. The MFP cooperation application 28e generates the job setting information D4 based on the job setting operation by the authenticated user, and sends the generated job setting information D4 to the respective image processing devices 3a and 3b.

In response to receiving the job setting information D4 from the MFP cooperation application 28e, each image processing device 3a and 3b brings again the determining unit 44 in operation. The determining unit 44 determines whether or not the setting of the job configured by the authenticated user is within the authority of the authenticated user (processes P30 and P32). When the setting of the job configured by the authenticated user is within the authority of the authenticated user, the determining unit 44 allows the job controller 31 to apply the setting based on the job setting information D4. The job controller 31 of each image processing device 3a and 3b applies the setting of the job to the respective image processing devices 3a and 3b based on the job setting information D4 received from the MFP cooperation application 28e (processes P31 and P33).

The authenticated user may give the job execution instruction. In such a case, the MFP cooperation application 28e sends the job execution instruction D5 to at least one of the multiple image processing devices 3a and 3b. The image processing device 3a thereby received executes the job specified by the user (process P34), and generates the job data D7. The image processing device 3a sends the job data D7 to the MFP cooperation application 28e.

When receiving the job data D7 from the image processing device 3a, the MFP cooperation application 28e forwards the job data to another image processing device 3b. As a result, the image processing device 3b is allowed to obtain the job data D7 generated at the image processing device 3a. The image processing device 3b executes the job based on the job data D7 obtained from the image processing device 3a (process P35).

As described above, the MFP cooperation application 28e accesses each of the first and the second image processing devices 3a and 3b, and obtains the job data from the first image processing device 3a. The MFP cooperation application 28e then forwards the job data to the second image processing device 3b, thereby enabling the second image processing device 3b to execute the job such as the print job. The first and the second image processing devices 3a and 3b may work together as described above. Even in such a case, each of the first and the second image processing devices 3a and 3b is configured to determine if the MFP cooperation application 28e is the registered application based on the information received in advance from the authentication server 10 when the access request D2 is received from the MFP cooperation application 28e. This never compromises the security.

As described above, even if the information relating to the application is not registered in advance with the image processing device, the image processing device is allowed to only allow the access from the reliable application, thereby controlling not to have the low level of security of the image processing device.

Second Preferred Embodiment

Figure 8:
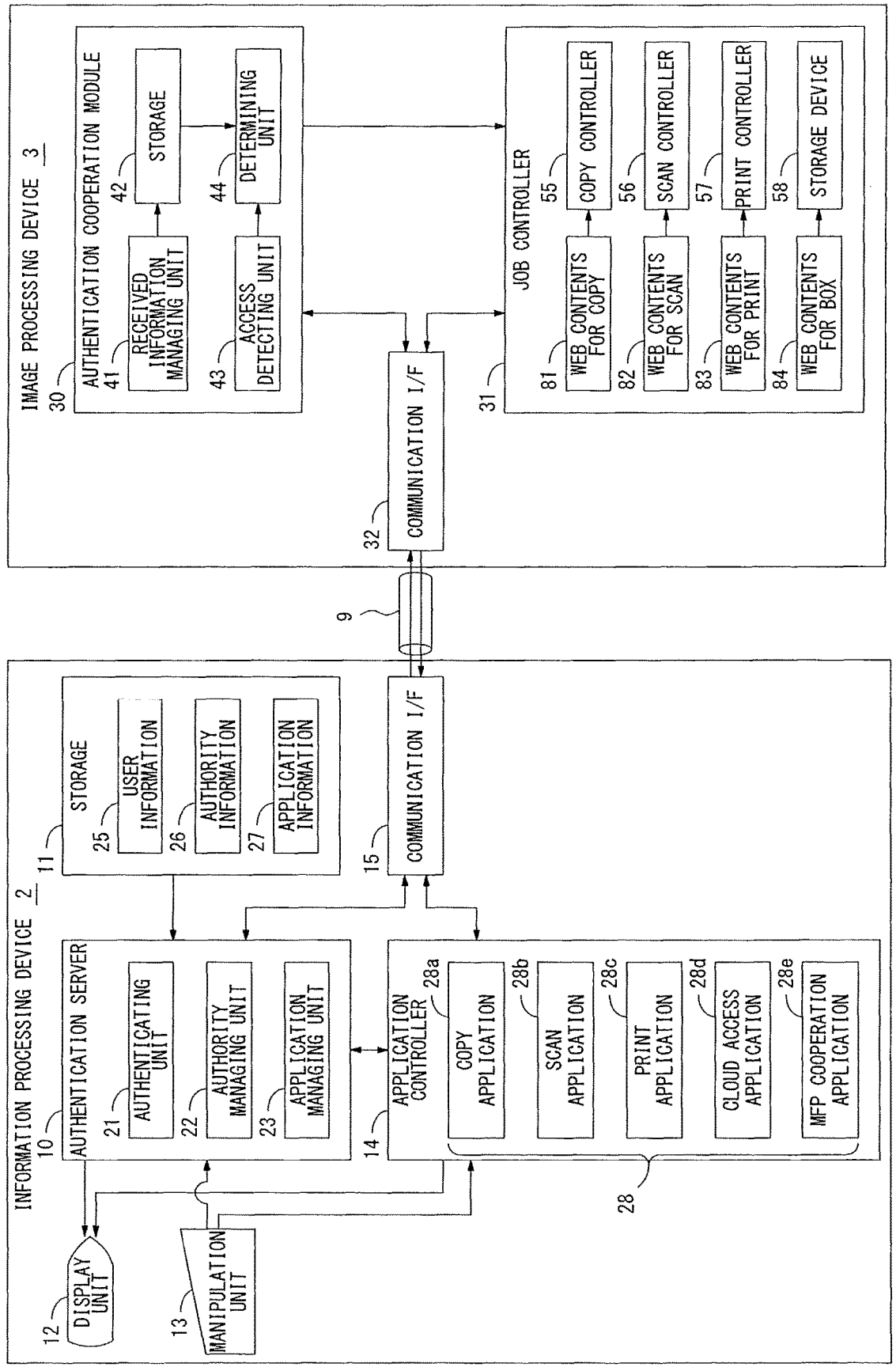
FIG. 8 is a block diagram showing an example of a hardware structure and that of a functional structure of each of the information processing device and the image processing device of the image processing system of a second preferred embodiment

The second preferred embodiment of the present invention is explained next. FIG. 8 is a block diagram showing an example of a hardware structure and that of a functional structure of each of the information processing device 2 and the image processing device 3 of the image processing system 1 of the second preferred embodiment. The job controller 31 of the image processing device 3 of the second preferred embodiment is formed from a web server, for example. To be more specific, the job controller 31 includes web contents for copy 81, web contents for scan 82, web contents for print 83, web contents for box 84 instead of the copy interface 51, the scan interface 52, the print interface 53 and the box interface 84 of the first preferred embodiment. The web contents for copy 81 provide a user interface for the access to the copy controller 55. The web contents for scan 82 provide the user interface for the access to the scan controller 56. The web contents for print 83 provide the user interface for the access to the print controller 57. The web contents for box 84 provide the user interface for the access to the storage device 58.

The application 28 installed on the information processing device 2 is a browser application that accesses the job controller 31 formed from the web server, thereby obtaining the aforementioned web contents 81, 82, 83 and 84, and displaying on the display unit 12. The copy application 28a, for example, is the browser application that is configured in advance to obtain the web contents for copy 81 of the job controller 31 and display on the display unit 12. The scan application 28b, for example, is the browser application that is configured in advance to obtain the web contents for scan 82 of the job controller 31 and display on the display unit 12. As described above, the multiple applications 28a to 28e are installed for each function in the image processing device 3. Each of the multiple applications 28a to 28e is configured to obtain the different web contents from the job controller 31 of the image processing device 3 and display on the display unit 12. However, this is given not for limitation. Single browser application may be installed on the information processing device 2. The single browser application may obtain each of the web contents for copy 81, the web contents for scan 82, the web contents for print 83 and the web contents for box 84.

As well as in the first preferred embodiment, after authenticating the user in the authentication and entering the logged-in state in which the authenticated user is logged in, the authentication server 10 sends the login information D1 including the application information relating to the application 28 available for the authenticated user to the image processing device 3. The authority information of the authenticated user is sent to the image processing device 3 at the same time. The image processing device 3 stores the information received from the authentication server 10.

After the authenticated user starts executing the application 28, the application 28 sends the access request D2 to the image processing device 3. The access request D2 contains information showing that is the request for the access to what web contents, the web contents for copy 81, the web contents for scan 82, the web contents for print 83 or the web contents for box 84.

In response to receiving the access request D2 from the application 28, the authentication cooperation module 30 puts the determining unit 44 into operation to determine whether or not the access is from the registered application as well as in the first preferred embodiment. The determining unit 44 determines whether or not the authenticated user is allowed to use the function corresponding to the web contents, the destination of the access from the application 28, based on the authority information of the authenticated user. If the application 28 is the registered application and the authenticated user has the authority to use the function corresponding to the web contents, the destination of the access, the determining unit 44 allows the access from the application 28.

Only when the access is allowed by the determining unit 44, the job controller 31 reads the web contents which is the destination of the access from the application 28, and provides the read web contents with the application 28. The application 28 is then allowed to display the user interface based on the web contents obtained from the image processing device 3 on the display unit 12. The application 28 executes the program such as the script included in the web contents in response to the authenticated user's operation, thereby putting the copy controller 55, the scan controller 56, the print controller 57 or the storage device 58 into operation. Even when the program such as the script is executed, the determining unit 44 may make the determination whether or not to allow the access.

As described above, the image processing device 3 of the second preferred embodiment is capable of determining for each function whether or not to allow the access from the application 28 even if the application 28 executed at the information processing device 2 is the browser application. This can prevent from having the low level of security. The other structures in the second preferred embodiment except for the above-described ones are the same as those in the first preferred embodiment.

Third Preferred Embodiment

Figure 9:
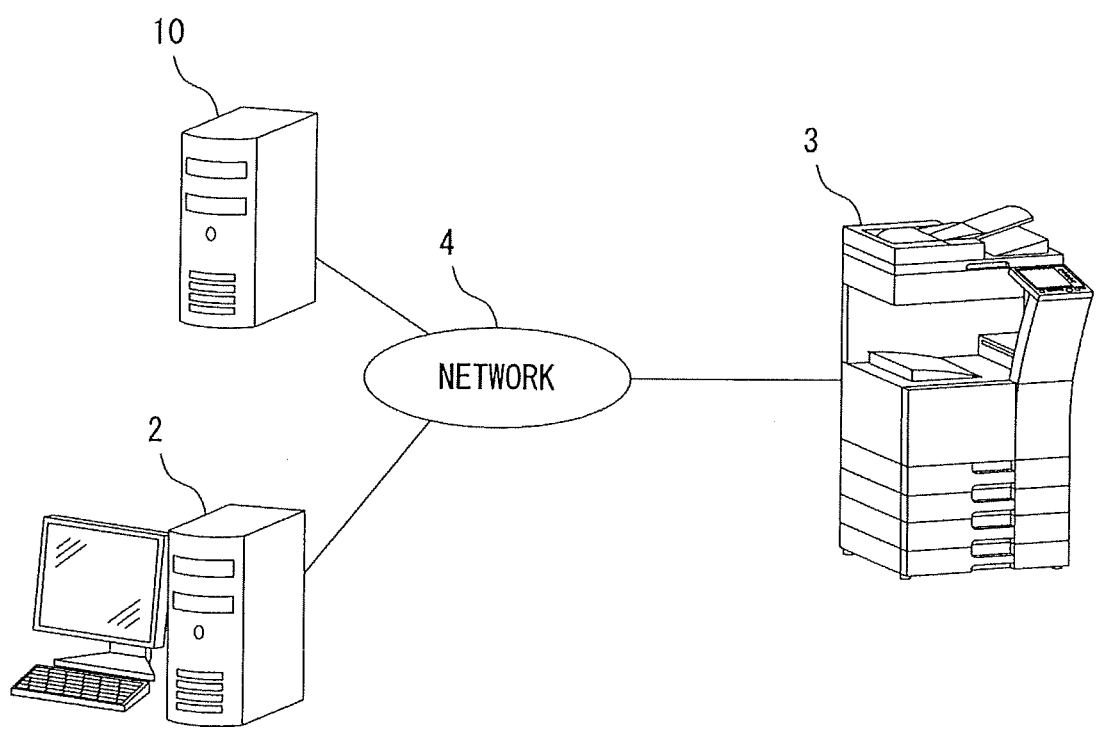
FIG. 9 shows an exemplary configuration of an image processing system of a third preferred embodiment.

The third preferred embodiment of the present invention is explained next. FIG. 9 shows an exemplary configuration of the image processing system 1 of the third preferred embodiment. The image processing system 1 comprises the information processing device 2, the image processing device 3 and the authentication server 10 connected to the network 4. To be more specific, the authentication server 10 of the third preferred embodiment is installed outside of the information processing device 2. The authentication server 10 of the third preferred embodiment includes the aforementioned storage 11 inside.

Figure 10:
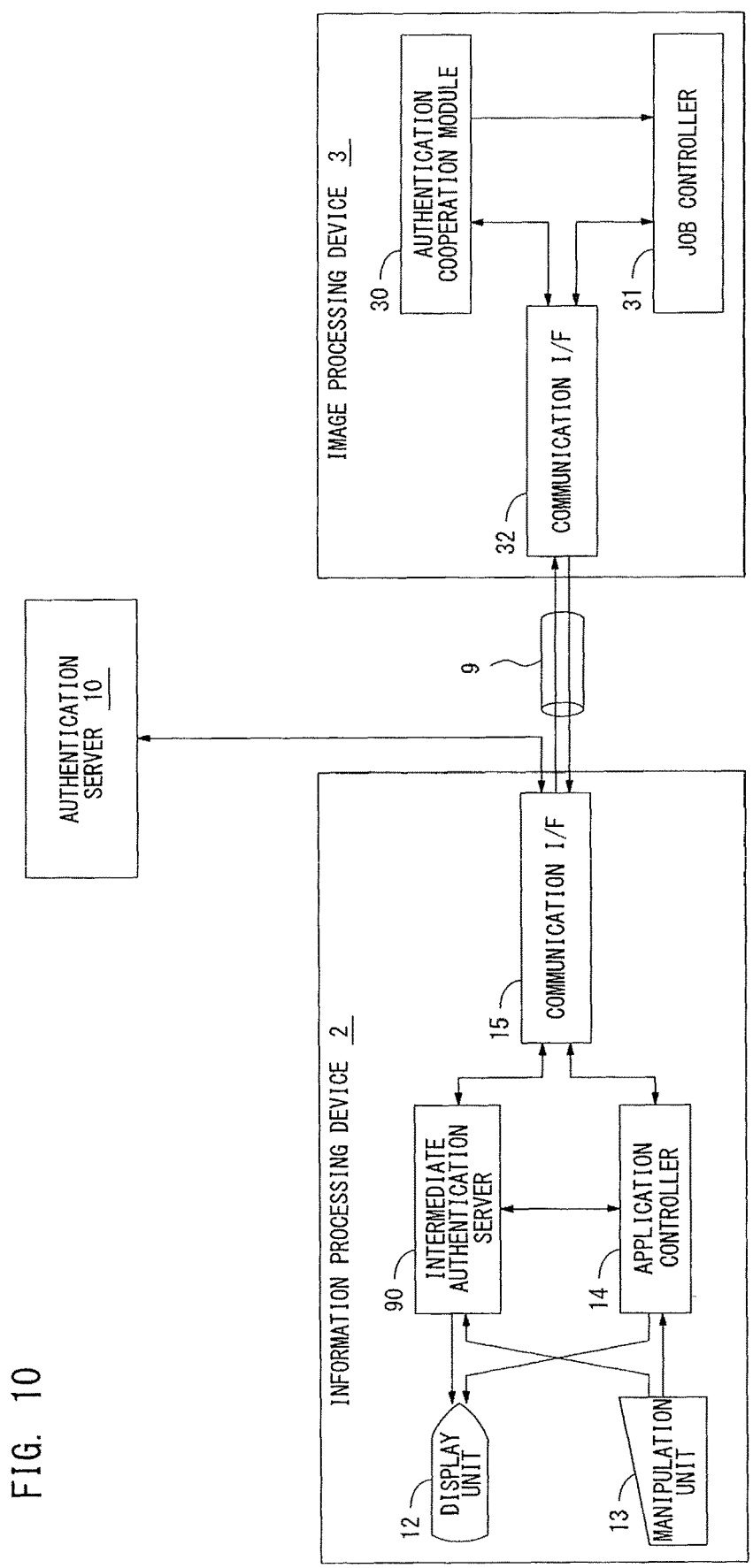
FIG. 10 is a block diagram showing an example of a hardware structure and that of a functional structure of each of the information processing device and the image processing device of the third preferred embodiment.

FIG. 10 is a block diagram showing an example of a hardware structure and that of a functional structure of each of the information processing device 2 and the image processing device 3 of the third preferred embodiment. The information processing device 2 of the third preferred embodiment includes an intermediate authentication server 90 to communicate with the authentication server 10. When the user ID and the password are entered through the manipulation unit 13, the intermediate authentication server 90 sends the entered user ID and password to the authentication server 10 and requests the authentication server 10 for the authentication. The authentication server 10 performs the authentication based on the information received from the intermediate authentication server 90, and sends the result to the intermediate authentication server 90. When the authentication results in success through the authentication, the authentication server 10 sends the authentication user information relating to the authenticated user and/or the authority information of the authenticated user to the intermediate authentication server 90 together with the information showing that the authentication results in success.

When the user is successfully authenticated by the authentication server 10, the intermediate authentication server 90 enables the information processing device 2 to enter the logged-in state based on the information received from the authentication server 10, and sends the login information to the image processing device 3. This time, the intermediate authentication server 90 establishes the session 9 for communication with the predetermined protocol with the image processing device 3, and sends the login information via the session 9. For sending the login information to the image processing device 3, the intermediate authentication server 90 sends the application information relating to the application installed on the information processing device 2 and available for the authenticated user. The intermediate authentication server 90 also sends the information received from the authentication server 10 to the image processing device 3. After that, the intermediate authentication server 90 operates as the same as the authentication server 10 already explained in the first and the second preferred embodiments. Everything else is the same as what explained in the first and the second preferred embodiments.

As described above, the authentication server 10 of the third preferred embodiment is installed outside the information processing device 2. The single authentication server 10 may be shared by one or more information processing devices 2. The single authentication server 10 is shared by one or more information processing devices 2, and at the same time, each of the information processing devices 2 performs the operations as the same as that explained in the first or the second preferred embodiment. This can avoid from the use of the unauthorized application, resulting in improvement in the security.

MODIFICATIONS

While the preferred embodiments of the present invention have been described above, the present invention is not limited to the preferred embodiments. Various modifications may be applied to the present invention.

In the above-described first, second and third preferred embodiments, the login information D1 sent from the information processing device 2 to the image processing device 3 when the authentication server 10 authenticates the user includes the authentication user information 61, the login time information 62 and the identification information 64 besides the application information 63. When receiving the access request D2, the image processing device 3 determines if all of the information as described above matches. However, this is given not for limitation. More specifically, if at least one of the authentication user information 61, the login time information 62 and the identification information 64 matches besides the application information 63, the image processing device 3 may determine the application is the registered application 28 and allow the access. In this case, it is not necessary to attach all of the authentication user information 61, the login time information 62 and the identification information 64 to the login information D1 sent from the information processing device 2 to the image processing device 3. At least one of the information used for the determination at the image processing device 3 may be attached.

In the above-described first, second and third preferred embodiments, the information processing device 2 is provided with the display unit 12 and the manipulation unit 13. However, this is given not for limitation. The display unit 12 and the manipulation unit 13 may be placed outside the information processing device 2. A device such as the personal computer connected to the network 4, for example, may be used as the aforementioned display unit 12 and manipulation unit 13.

In the above-described first, second and third preferred embodiments, the information processing device 2 and the image processing device 3 are placed as separate devices. However, this is given not for limitation. The information processing device 2 and the image processing device 3 in the above-described first, second and third preferred embodiments may be built into a single information device. In such a case, the network 4 connecting the information processing device 2 and the image processing device 3 may be installed inside the information device. Also, in this case, the information device including the information processing device 2 and the image processing device 3 is the image processing system 1 as described above. If the display unit 12 and the manipulation unit 13 are installed in the information processing device 2, the display unit 12 and the manipulation unit 13 may be used as the user interface for the use of the information device by the user.

Although the present invention has been described and illustrated in detail, it is clearly understood that the same is by way of illustrated and example only and is not to be taken by way limitation, the scope of the present invention being interpreted by terms of the appended claims.

What is claimed is:

1. An information processing device that performs an authentication to authenticate a user and controls operations of an image processing device based on a result of said authentication, comprising:
   a plurality of applications configured to access said image processing device and perform a process to enable said image processing device to operate;
   a user interface configured to enable the user to enter login information;
   an authentication server that performs said authentication to authenticate the user when the login information matches information previously stored in the information processing device,
   a communication interface for sending first information to the image processing device when the user is authenticated by the authentication server of the information processing device, the first information including the user's login information and information concerning the applications of the plurality of applications that the user is authorized to use;

the user interface being further configured to enable the authenticated user to enter an instruction selecting one of the plurality of applications; and in response to the authenticated user selecting the one application, said application generates an access request including the user's login information and information relating to said selected one application and sends said generated access request to said image processing device when accessing said image processing device so that the information relating to said selected one application in the access request can be cross-checked with the first information by the image processing device in order to determine that the authenticated user is authorized to use the selected one application.

2. The information processing device according to claim 1, wherein
said authentication server enables said information processing device to enter a logged-in state in which the authenticated user is allowed to use said image processing device when successfully authenticating the user through said authentication and sends logout information to said image processing device when the authenticated user logs out.

3. The information processing device according to claim 1, wherein
said authentication server establishes a session with said image processing device for sending the application information to said image processing device, and
said one application uses said session to communicate with said image processing device for the access to said image processing device.

4. The information processing device according to claim 1, wherein
said one application is a browser application that accesses a web server installed in said image processing device, thereby obtaining web contents and displaying, and
said browser application executes a program in said web contents, thereby enabling said image processing device to operate.

5. The information processing device according to claim 1, wherein
said authentication server manages each of multiple users' authority information on use of said image processing device, and further sends the authority information relating to the authenticated user to said image processing device when successfully authenticating the user through said authentication.

6. The information processing device according to claim 1, wherein
said authentication server only sends the application information relating to the one of said applications, which is available for the authenticated user, when successfully authenticating the user through said authentication.

7. The information processing device according to claim 1, wherein
said authentication server sends unique identification information relating to said information processing device to said image processing device when sending the application information to said image processing device, and
said one application attaches said identification information to said access request and sends it to said image processing device when accessing said image processing device.

8. The information processing device according to claim 1, wherein
said one application is capable controlling more than one said image processing devices, and
said one application accesses the first image processing device and the second image processing device of said more than one image processing devices and enables the first image processing device and the second image processing device to work together to execute a job.

9. The information processing device according to claim 1, wherein the plurality of applications are configured to access said image processing device and perform a process to enable said image processing device to perform image processing.

10. An image processing system that comprises an information processing device and an image processing device, wherein
said information processing device includes:
a plurality of applications configured to access said image processing device and perform a process to enable said image processing device to operate;
an authentication server that performs said authentication to authenticate the user, and
a user interface configured to enable the user to enter login information and an instruction selecting one of the plurality of applications; and
said application generates an access request including the user's login information and information relating to said selected one application and sends said generated access request to said image processing device when accessing said image processing device in response to the instruction given by the authenticated user who is successfully authenticated through said authentication; and
said image processing device includes:
a storage in which the application information received from said authentication server is stored; and
a hardware processor configured to cross-check information in an access request with the application information stored in said storage when the access request is received from said one application, thereby determining whether or not to allow an access from said one application.

11. The image processing system according to claim 10, wherein
said authentication server enables said information processing device to enter a logged-in state in which the authenticated user is allowed to use said image processing device when successfully authenticating the user through said authentication and sends logout information to said image processing device when the authenticated user logs out, and
said hardware processor allows the access from said one application from the receipt of said access request to the receipt of said logout information if the information in said access request matches with the information stored in said storage.

12. The image processing system according to claim 10, wherein
said authentication server establishes a session with said image processing device for sending the application information to said image processing device, and
said one application uses said session to communicate with said image processing device for the access to said image processing device.

13. The image processing system according to claim 10, wherein said image processing device further includes a web server that provides web contents,
said one application is a browser application that accesses said web server, thereby obtaining said web contents and displaying, and
said browser application executes a program in said web contents, thereby enabling said image processing device to operate.

14. The image processing system according to claim 10, wherein
said authentication server manages each of multiple user's authority information on use of said image processing device, and sends the authority information relating to the authenticated user when successfully authenticating the user through said authentication, and
said hardware processor allows the access from said one application based on the authority information received from said authentication server if the information in said access request matches with the application information stored in said storage.

15. The image processing system according to claim 10, wherein
said authentication server only sends the application information relating to the one of said applications, which is available for the authenticated user, when successfully authenticating the user through said authentication.

16. The image processing system according to claim 10, wherein
said authentication server further sends unique identification information relating to said information processing device to said image processing device when sending the application information to said image processing device,
said identification information received from said authentication server is stored in said storage together with the application information,
said one application attaches said identification information to said access request and sends it to said image processing device for the access to said image processing device, and
said hardware processor cross-checks the information in said access request with the application information stored in said storage and cross-checks said identification information attached to said access request with the identification information stored in said storage, thereby determining whether or not to allow the access from said one application when said access request is received from said one application.

17. The image processing system according to claim 10, wherein
said image processing system comprises more than one said image processing devices, and
said one application accesses the first image processing device and the second image processing device of said more than one image processing devices and enables the first image processing device and the second image processing device to work together to execute a job.

18. An image processing system comprises an information processing device, an authentication server and an image processing device, wherein
said authentication server includes an authenticating part that performs an authentication to authenticate a user in response to an authentication request received from said information processing device, and sends a result of said authentication to said information processing device, said information processing device includes:
an application that accesses said image processing device and performs a process to enable said image processing device to operate; and
a transmitter that sends application information relating to said application to said image processing device when successfully authenticating the user through said authentication, and
said image processing device includes:
a storage in which the application information received from said transmitter is stored; and
a hardware processor configured to cross-check information included in an access request with the application information stored in said storage, and determine whether or not to allow the access from said application when said access request is received from said application in said information processing device.

19. An image processing device capable of executing a job relating to an image processing, comprising:
a receiver for receiving an access request from an authentication server, the access request includes authentication information and a user instruction;
a storage that stores therein application information received from the authentication server;
a hardware processor configured to cross-check information included in the access request with the application information stored in said storage, and determine whether or not to allow access from an external application when said access request is received from said authentication server; and
the hardware processor is further configured to execute a job in response to the instruction when the access from said application is allowed.

20. The image processing device according to claim 19, wherein
said hardware processor allows the access until logout information is received from said access request is received if the information in said access request matches with the application information stored in said storage.

21. The image processing device according to claim 19, wherein
said hardware processor allows the access from said application based on authority information received from said authentication server if the information in said access request matches with the application information stored in said storage.

22. The image processing device according to claim 19, wherein
said storage stores therein unique identification information received from said authentication server together with the application information, and
said hardware processor cross-checks the information in said access request with the application information stored in said storage and cross-checks identification information attached to said access request with said identification information stored in said storage, thereby determining whether or not to allow the access from said application when said access request is received from said application.

23. A non-transitory recording medium storing a computer readable program to be executed by an image processing device capable of executing a job relating to an image processing, wherein execution of the computer readable program by said image processing device causing said image processing device to execute the steps of:

receiving an access request from an authentication server, the access request includes authentication information and a user instruction
storing application information received from the authentication server in a predetermined storage;
cross-checking information included in the access request with the application information stored in said storage, thereby determining whether or not to allow the access from an external application when said access request is received from said authentication server; and
executing a job in response to the instruction when the access from said application is allowed.

* * * * *